United States Patent [19]

Sims

[11] 3,718,544
[45] Feb. 27, 1973

[54] WATER HEATING AND PURIFICATION SYSTEM

[75] Inventor: Anker V. Sims, Redondo Beach, Calif.

[73] Assignee: Pollution Research & Control Corp., Glendale, Calif.

[22] Filed: Feb. 2, 1970

[21] Appl. No.: 7,852

[52] U.S. Cl. .............. 202/190, 202/196, 202/185 B, 122/17, 165/105, 137/577
[51] Int. Cl. ................. B01d 3/00, F28b, B01d 3/14
[58] Field of Search ...................... 202/190–193, 182, 202/185, 187, 189, 185 B, 195, 196; 165/105; 122/13–19; 137/590, 590.5, 577

[56] References Cited

UNITED STATES PATENTS

| | | | |
|---|---|---|---|
| 2,515,919 | 7/1950 | Wyenberg et al. | 122/17 X |
| 2,561,465 | 7/1951 | Epling et al. | 122/17 |
| 3,515,635 | 6/1970 | Curtis | 137/590 X |
| 604,550 | 5/1898 | Stretch | 202/185 C X |
| 901,645 | 10/1908 | Perry | 202/193 X |
| 1,922,844 | 8/1933 | Epstein | 202/189 |
| 1,971,139 | 8/1934 | Harris | 122/17 X |
| 3,380,895 | 4/1968 | Loebel | 122/17 X |
| 814,405 | 3/1906 | Smith | 202/187 |

FOREIGN PATENTS OR APPLICATIONS 118,482   9/1918   Great Britain .................. 202/188

Primary Examiner—Norman Yudkoff
Assistant Examiner—J. Sofer
Attorney—Lyon and Lyon

[57] ABSTRACT

Apparatus for producing distilled water and undistilled hot water including a hot water tank with an insulated lower portion and an uninsulated upper portion, condensation occurring on the walls forming the upper portion and resultant condensate being collected in a distillate trough positioned below the walls of the upper portion. A withdrawal tube adjustable in height extends below the water surface and means are provided in the inlet line to throttle the flow of incoming water to correspond closely to the flow from the hot water system under maximum demand conditions. A separate vaporizing vessel can be used in combination with a conventional hot water heater, the operation thereof requiring recirculation of water from the vessel to the hot water heater at periodic intervals.

5 Claims, 6 Drawing Figures

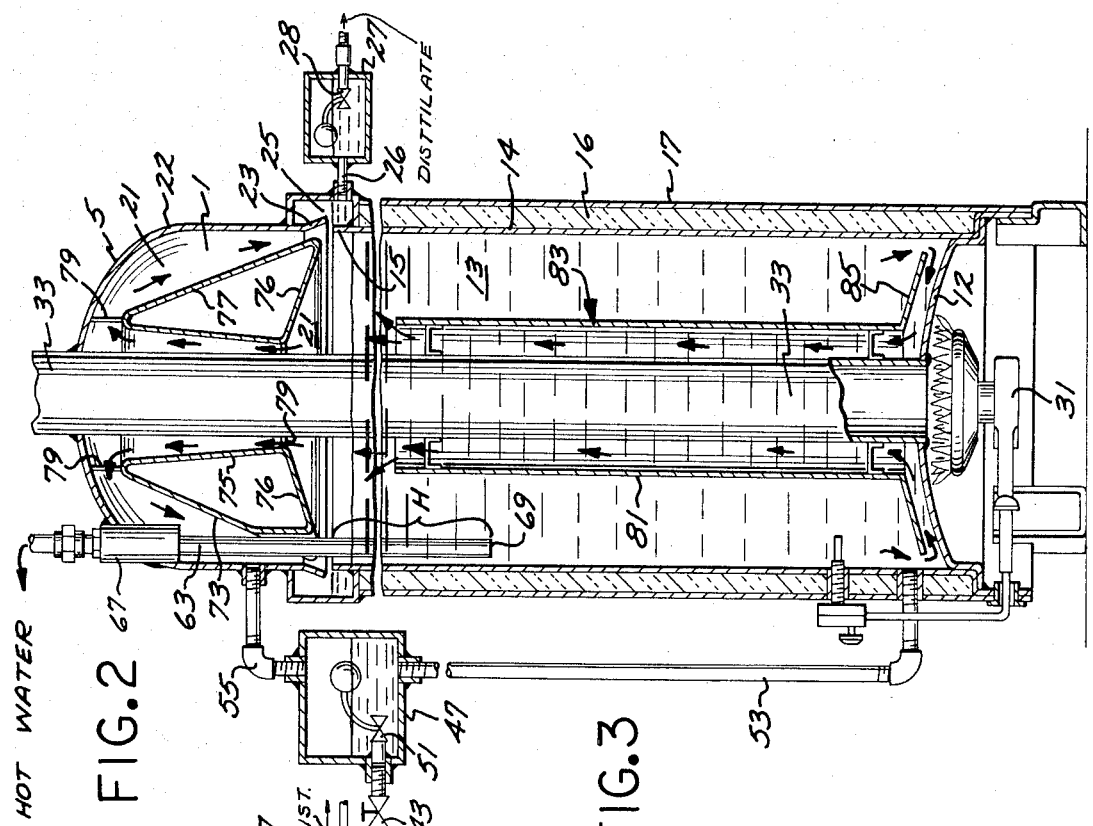

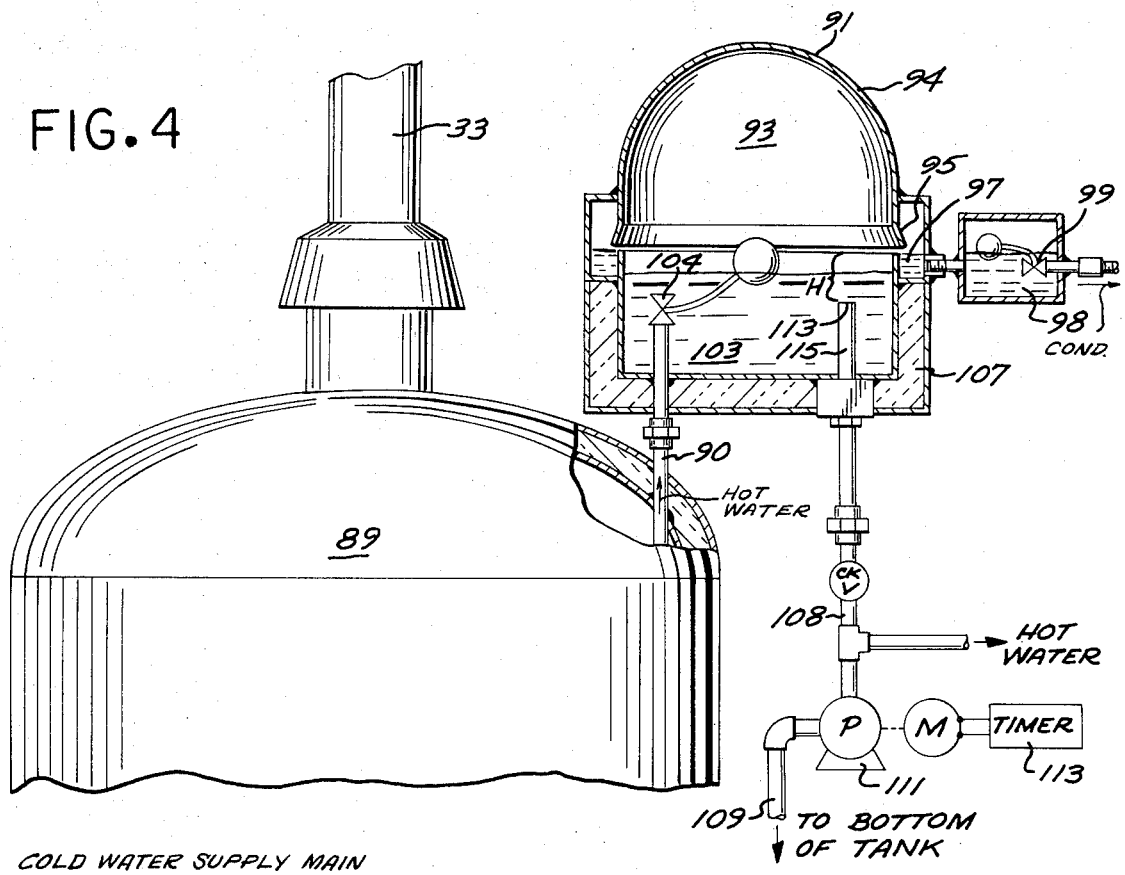
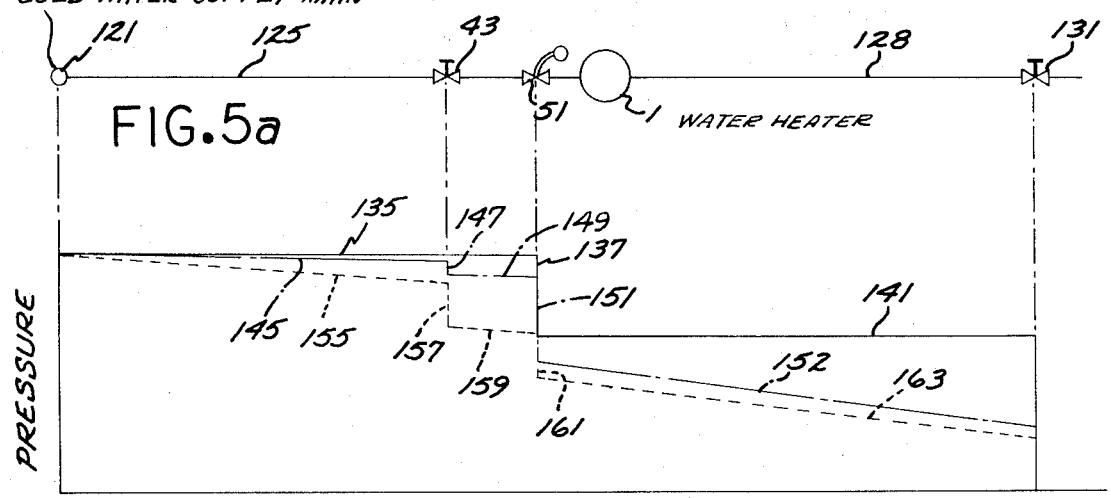

WATER HEATING AND PURIFICATION SYSTEM

In many of the conventional systems for the production of distilled water and hot undistilled water, condensation of water vapor is effected on the outside of coils carrying cooling water therein (see U.S. Pat. No. 3,380,895). The impurities carried in the cooling water will in time result in scaling on the inside surface of the coils and eventually necessitate either descaling, or else, replacement of the coils. Additionally, the flow of natural convection currents within the vapor space is retarded by the presence of these cooling coils which in effect act as baffles.

During operation of the systems in the prior art, noncondensable gases dissolved in the incoming water are liberated as the temperature of incoming water rises. These liberated noncondensable gases rise to the water surface and in time the quantity and partial pressure of these noncondensable gases in the closed vapor space begins to build up. With more and more noncondensable gases in the vapor space there is less chance for molecules of water vapor to come into contact with the condenser coils and consequently, these noncondensable gases tend to impair heat transfer and condensation of the water vapor with which they are admixed.

Additionally, these prior art systems employ a level controller to maintain the water level constant at an elevation above the open end of a withdrawal tube. As a result, the noncondensable gases cannot be vented from the system during withdrawal of hot water until the gases fill the space above the open end of the withdrawal tube and the pressure of the gases is very nearly equal to the water supply pressure. Noncondensable gases are therefore permanently maintained in the volume above the end of the withdrawal tube and at a pressure dependent on the hydraulics of the water system and the pressure in the mains. The dip tube can be adjusted in depth to provide for optimizing the release of these noncondensable gases as against the delivery of hot water from the system.

It is therefore a principal object of the present invention to provide an improved system for supplying hot undistilled water together with distilled water employing a non-scaling heat exchanger for condensation of water vapor.

Another object is to provide in a unit for heating and distilling water an improved heat exchange system which optimizes the natural convective currents in the vapor zone.

Still another object is to provide a novel means of venting noncondensable gases and adjusting the distillate yield in the water heater-distillation unit of the present invention.

Another object is to provide with the distillation apparatus of the present invention means to compress the gas-vapor mixture therein until the partial pressure of water vapor exceeds the vapor pressure of the water at the temperature of operation, thereby effecting condensation of the water vapor by compression.

Yet another object is to provide for use with a conventional hot water heater an improved vaporization and condensation apparatus.

Further objects and many of the attendant advantages of the present invention will be readily appreciated as the same becomes more fully understood by reference to the following detailed description when considered in connection with the accompanying drawings, wherein:

FIG. 1 is a preferred embodiment of a transverse vertical sectional view of a water heater-water purification apparatus constructed in accordance with the present invention, illustrating particularly the water level in the apparatus during operation thereof.

FIG. 2 is a fragmentary vertical sectional view of a modified form of the apparatus of FIG. 1, wherein there is provided means in the upper vapor space to channel the flow of rising water vapor to the condensing surface.

FIG. 3 is a fragmentary vertical sectional view of another modified form of the apparatus of FIG. 1, showing the lower portion of the apparatus with a submerged liquid riser means to facilitate the convective circulation of the heated water.

FIG. 4 is a fragmentary vertical view in partial section of another preferred embodiment showing the combination of a conventional water heater with a distillation unit of the present invention connected thereto.

FIG. 5a is a schematic diagram showing a line from the water main connected to the apparatus of the present invention together with a hot water supply system.

FIG. 5b shows the relative pressure along the system in FIG. 5a under varying flow conditions.

With reference now to the drawings, the water heater-distillation apparatus of the present invention indicated generally at 1, FIG. 1, comprises a vessel 5 having a lower portion 13 and an upper portion 21. Heating means such as the gas burner 31 in FIG. 1 is utilized in heating the body of water 37 in the lower portion of the apparatus, the combustion products from the gas burner rising in flue 33 which extends concentrically through vessel 5. If desired, any other suitable means, such as a submerged calrod may be used in heating the water.

To minimize heat losses from the lower portion 13 of vessel 5, a coating or sheath of insulating material 16 is preferably sandwiched between the inner wall 14 and an optional outer wall 17. The metal wall 22 forming the upper portion 21 of vessel 5 is uninsulated to facilitate heat transfer therethrough and condensation of water vapor therein. The inside surface of walls 14 and 22 are preferably glass-lined to prevent corrosion thereof with resultant contamination of water in the system. Where higher heat transfer rates are desired, the glass lining in the upper portion 21 may be coated with teflon to facilitate drop-wise condensation, or else, a Teflon coating (not shown) may be used in place of the glass lining.

The lower edge portion 23 of wall 22 flairs outwardly from the upper vapor zone 21 and into a circumferential distillate trough 25. Positioned at the same level as trough 25 is distillate collection vessel 27 connected thereto by line 26, a float valve 28 in vessel 27 permitting discharge of a distillate into a separate reservoir (not shown) before the level of distillate rises above and flows over the upper edge 15 of wall 14.

Unlike the systems employed heretofore which find it necessary to utilize condensing coils in the vapor space, it has unexpectedly been found that satisfactory yields of distillate can be obtained in the apparatus of the present invention without the use of condensing coils. It has been discovered in this connection that sufficient condensation takes place on the upper uninsulated wall 22 of vessel 5 when no coils are present in the vapor space to hamper or retard the natural convective currents therein. In a typical home installation using, for example, from a 40 to 80 gallon vessel, satisfactory operation can be achieved when the vapor space above the level of distillate trough 25 occupies from about 10 to 40 percent, preferably from about 15 to 30 percent, more preferably from about 20 to 25 percent of the total volume of the vessel.

During operation, make-up water from main 121, FIG. 5a, passes through constrictive orifice or valve 43, FIG. 1, into float box 47 having float valve 51 therein. When the water level in vessel 5 and float box 47 drops below a preselected level which is slightly below the distillate trough 25, float valve 51 opens permitting make-up water to flow into the system through line 53. As the level of water rises in float box 47, noncondensable gases therein are vented via line 55 to vessel 5 thereby equalizing the pressure in the vapor space.

Hot undistilled water is withdrawn from the system through withdrawal tube 63 which extends through packing gland 67 located in an upper portion of wall 22. In a preferred installation, an adjustable withdrawal tube 63 extends a predetermined distance H below the distillate trough 25. The volume of vessel 5 between the level of distillate trough 25 and the open end 69 of adjustable withdrawal tube 63 preferably occupies from about 25 to 200 percent, more preferably from about 50 to 100 per cent of the volume of the vessel above distillate trough 25.

As make-up water either saturated or nearly saturated with noncondensable gases is heated in lower portion 13, a fraction of these gases is liberated and collects in the upper portion 21 of the vessel. As additional noncondensable gases are released, the gas pressure in upper portion 21 continues to rise. This gradual buildup of gas pressure in the system continues until sufficient pressure is built up to force the level of the water down to the open end 69 of the dip tube, at which time these gases are vented from the system when hot water is withdrawn. As the gas pressure in the vapor space drops due to this venting action, the rate of water flow from the heater diminishes i.e., the gas pressure available to force water from the system is lower. During this segment of the operating cycle when the pressure at the water source (the water main) exceeds the internal pressure in the vapor space, more water flows into the system than out. This unequal rate of flow continues until the water rises to a level at which float valve 51 closes. This cycle repeats and the pressure in the vessel again reaches some value close to that pressure when noncondensable gases vent.

As above described, venting of noncondensable gases is achieved by use of constrictive orifice or valve 43 and adjustment of the open end 69 of withdrawal tube 63 with respect to the level of distillate trough 25. For example, as hot water is initially withdrawn from the system the pressurized gas-vapor mixture in upper portion 21 acts upon the surface of the water forcing it down and out through dip tube 63. After the water level drops a short distance, somewhere on the order of from one-half to 2 inches, float valve 51 opens and water from the main flows into the system via line 53. The constriction 43 in the inlet retards somewhat the water flow into the system; consequently, the rate of water withdrawal from the hot water system can be greater than the inlet flow of make-up water. Under such conditions, the level of water will continue to drop until either it reaches the end of the dip tube 63, or else, inlet water pressure equalizes with the internal pressure. The water level usually drops a height H to the open end 69 of withdrawal tube 63 and a portion of the gas-vapor mixture vents. Utilizing the method of the present invention, it is thus possible to maintain the volume percent of noncondensable gases in upper portion 21 to acceptable levels which do not seriously impair heat transfer.

Accordingly, when it is desired to maximize distillate yield and a relatively low rate of hot water withdrawal can be tolerated, the open end 69 of withdrawal tube 63 can be located below distillate trough 25 a distance from about 2 to 8 inches, preferably from about 4 to 6 inches in a conventional 60 gallon unit. Conversely, where maximum production of hot water is desired and only minimum distillate yields are acceptable, the open end 69 of withdrawal tube 63 can be located below distillate trough 25 a depth from about 16 to 24 inches, preferably from about 18 to 20 inches in such a typical 60 gallon unit.

The constriction 43 in the inlet line preferably effects a pressure drop therein at least 10 percent as great as the pressure drop between the hot water tank and the hot water tap during maximum flow. Thus, the constriction 43 is adjusted for the particular installation taking into account the number of hot water taps in the home and the pressure drop in the line, under maximum flow conditions, between the hot water tank and the taps. In normal operation, all hot water taps in the system will seldom be opened simultaneously and usually only two hot water taps will be open at the same time. In such instances, constriction 43 may be adjusted to effect a pressure drop in the inlet of from about 20 to 70 percent of the total pressure drop in the system under maximum flow conditions with such two taps full open. It can thus be seen that by constricting the inlet water flow the water level will fluctuate during operation and drop a predetermined distance below the level of the condensate collector.

It was unexpectedly found when operating in this manner, i.e. effecting fluctuations in the water level, the distillate yield is from about 5 to 15 percent greater than that obtained without such fluctuations. Although the mechanism responsible for this dramatic increase in yield is not entirely understood, it is believed that the partial pressure of water vapor in upper zone 21 approximates the vapor pressure of water and as the water rises compressing the water vapor-noncondensable gas mixture, the partial pressure of water vapor exceeds the vapor pressure of the water at that temperature. This rise in the water level effects additional condensation on inner walls 22. It is therefore an important aspect of the present invention to effect fluctuations in the water level during operation.

In a preferred embodiment, FIG. 2, a doughnut shaped heat shield indicated generally at 73, occupies a substantial volume of the upper portion 21 of vessel 5. The inner wall 75 of shield 73 is spaced from flue 33 a distance sufficient to facilitate the convective flow of the gas-vapor mixture rising therebetween. Preferably, wall 75 slopes upwardly away from flue 33 to permit expansion of the gas-vapor mixture as it contacts the hot flue surface. The uppermost portion of shield 73 is likewise spaced a sufficient distance from the upper wall 22 to permit the maximum gas flow therebetween, it being desired to shield the maximum area of wall 22 from heat radiating from the flue surface. The outermost wall 77 of shield 73 slopes downwardly at an angle from the flue to effect a reduction of the gas-vapor volume corresponding closely to the reduction in volume of water vapor due to cooling and condensation.

Preferably, shield 73 occupies the maximum permissible volume of upper portion 22 which will not seriously impair the flow of rising vapors to the cool surface of wall 21. Generally, the greater the volume of heat shield 73 in the vapor space, the greater the compression ratio of the gas-vapor mixture during fluctuations of the water level. Heat shield 73 may be constructed of any suitable thin gauge sheet metal and secured to wall 22 and flue 33 by brackets 79.

Suitably, A typical 50 gallon hot water heater can utilize in the upper portion 21 thereof a heat shield 73 which occupies from about 30 to 80 percent, preferably from about 40 to 60 percent by volume of upper portion 21. Desirably, the lower wall 76 of the heat shield slopes upwardly toward the flue to channel vapor rising from the water surface upwardly and inwardly toward the flue.

Mixing and channeling of water in the lower portion 13 of vessel 5 can also be achieved by incorporating therein a liquid riser 81 as in FIG. 3. The riser 81 comprises a cylindrical portion 83 having a diameter from about 1¼ to 2 times, preferably from about 1½ to 1¾ times greater than the diameter of the flue, and a lower portion 85 connected thereto which extends downwardly. The outermost edge of lower portion 85 is spaced from both the bottom 12 and side wall 14 of vessel 5, a sufficient distance to permit natural convective flow of water in the vessel. As water is heated by burner 31, it tends to rise in the space between the flue and wall 83 of liquid riser 81. During its upward rise, it is further heated by contact with the flue. Consequently, the hottest water produced in the system emerges from the liquid riser directly to the water surface. By use of such a device, it has unexpectedly been found that the distillate yield can be increased at least about 4 percent over such systems without a liquid riser.

FIG. 4 shows a further form of the invention wherein there is employed in combination with a conventional hot water heater 89 a separate vaporizing vessel indicated generally at 91 which comprises an upper portion 93 and a lower portion 103. Hot water is supplied from hot water heater 89 via line 90, and through float valve 104 into the lower portion 103 which is provided with an insulating layer 107. Vapors rising from the body of hot water contact uninsulated wall 94 in upper portion 93 and condense thereon. The distillate falling down the sides of wall 94 is channeled into distillate trough 97 by means of the outwardly flared bottom edge 95 of wall 94. Positioned at the same level as distillate trough 97 is a distillate collection vessel 98 connected thereto, a float valve 99 in vessel 98 permitting discharge of distillate into a separate reservoir (not shown) before the level of distillate rises above the upper edge of the lower portion 103.

To maintain in vaporizing vessel 91 a body of water at a temperature relatively close to that of the water temperature in hot water heater 89, a pump 111 is provided to recirculate cooled water via lines 108, 109 back to the bottom of the hot water heater. Satisfactory distillate yields can be obtained with only intermittent operation of the recirculation pump 111. A timer 113 can be connected to pump 111 to effect recirculation of cooled water at any desired interval. It has been found that a vessel 91 producing a volume of about 7 gallons of distillate per week when the body of water and lower portion 103 is replenished with hot water about 50 to 60 times per day.

In operation of the vaporizing vessel 91, the level of water begins to drop as water is withdrawn and float valve 104 thereafter opens to permit entry of hot water via line 90 from heater 89. To facilitate maximum venting of noncondensable gases from upper portion 93, the open end 113 of withdrawal tube 115 is positioned only a short distance, on the order of about 2 to 6 inches, below the level of the distillate tray.

As in the case of the apparatus in FIG. 1, the level of water in vessel 91 is caused to fluctuate in operation to raise the partial pressure of the water vapor in upper portion 93 above the vapor pressure of water at that temperature of operation. Consequently, the distillate yield obtained with a fluctuating water level has also unexpectedly been found to be at least 10 percent greater than obtainable with a constant water level.

Turning now to FIG. 5a, there is shown schematically a line diagram of water main 121 connected via line 125 through constriction 43 and float valve 51 to the apparatus 1 of the present invention. The hot water supply system 128 is shown illustratively with only one valve 131 in the line. Shown directly below the line diagram in FIG. 5a is a plot in FIG. 5b of the relative pressure at various points along the system. For example, the pressure profile in the system without flow is shown by line 135 with a pressure drop illustrated by line 137 across float valve 51, and the pressure in apparatus 1 and hot water supply system by line 141.

As hot water is initially withdrawn from a tap, the pressure in line 125 shown in the plot as 145 slopes slightly from the horizontal. A slight pressure drop 147 occurs at the outset across constriction 43, a substantial pressure drop 151 occurring across float valve 51 with a gradual pressure drop through apparatus 1 and the hot water supply system shown by line 152.

Under stable flow conditions the pressure profile of the system is illustrated by lines 155, a sharp pressure drop 157 occurring across constrictive orifice 43, a slight pressure drop 159 occurring in the line between valve 43 and valve 51, a sharp pressure drop 161 occurring across valve 51, and a rather uniform pressure drop 163 shown across apparatus 1 and hot water supply system 28, 131. It can be seen from the above pressure profiles that the combined pressure drop in the lines between the main 121 and float valve 51 results in a flow into the apparatus corresponding to the flow therefrom.

When starting up the apparatus of the present invention, it is important to set the average operating pressure and flow through the system by adjusting the height $h$ of withdrawal tube 63 and the pressure drop across throttle valve 43. This can be achieved by temporarily connecting a gauge or sight glass to the tank and then moving the withdrawal tube so that the bottom end thereof is submerged about 18 inches below the highest water level as determined when float valve 51 is closed.

Thereafter, the hot water tap most remote and furthest removed from the tank is opened full and allowed to run until the water level in the tank stops falling. If the flow rate from this remote tap is still adequate, throttle valve 43 is closed slightly causing a further drop in the water level. This procedure is repeated until the flow rate from the remote tap is below acceptable standards. Valve 43 is then opened slowly until the flow from the remotest tap is adequate, the water level rising slightly as valve 43 is opened. Next, valve 43 is opened further to raise the water level about an additional one-half inch and withdrawal tube is raised until its bottom end is about a half inch below the water level.

From the foregoing description, it can be readily seen that the present invention provides a simple, practical, and reliable system for the production of distilled water and hot undistilled water. It is thus now possible to produce acceptable yields of distillate using a conventional hot water heater and effect condensation upon a non-scaling heat transfer surface.

From the foregoing description, one skilled in the art can easily ascertain the essential characteristics of this invention, and without departing from the spirit and scope thereof, can make various changes and modifications of the inventions to adapt it to various usages and conditions. Consequently, such changes and modifications are properly, equitably, and intended to be, within the full range of equivalence of the following claims.

What I claim is:

1. An apparatus for the production of distilled water and undistilled hot water comprising: a vessel having walls forming an insulated lower portion and an uninsulated upper portion, means to heat a body of water in said lower portion to a temperature below the boiling point thereof, cold water supply means connected to said lower portion to maintain the vessel partially filled with water, whereby to provide vapor space in the upper portion, distillate collecting means positioned below the walls forming the upper portion, said uninsulated walls providing an inner heat transfer surface for vapor condensation thereon and a lower peripheral edge of the uninsulated wall flaring outwardly to direct flow of distillate from said heat transfer surface into the distillate collecting means, hot water withdrawal pipe means in the upper part of the lower portion to supply hot undistilled water to a hot water system, the withdrawal pipe means having an inlet being adjustable in height with respect to the distillate collecting means whereby to permit adjustment of the distillate yield in comparison with the withdrawal rate of hot undistilled water, adjustable pressure drop means in the cold water supply means to throttle flow of the incoming cold water to correspond closely to the flow of the hot water from the vessel to a hot water system under maximum demand, and stationary upright annular means in said upper portion to facilitate natural convective flow of vapors and gases in the upper portion.

2. An apparatus for the production of distilled water and undistilled hot water comprising: a vessel having walls forming an insulated lower portion and an uninsulated upper portion, heating means in the lower portion to heat a body of water therein to a temperature below the boiling point thereof and a flue for exhausting the combustion gases from the heating means extending upwardly through the vessel, cold water supply means to maintain the vessel partially filled with water, whereby to provide vapor space in the upper portion, distillate collecting means positioned below the walls forming the upper portion, said uninsulated walls providing an inner heat transfer surface for vapor condensation thereon and a lower peripheral edge of the uninsulated wall flaring outwardly to direct flow of distillate from said heat transfer surface into the distillate collecting means, hot water withdrawal means in the upper part of the lower portion to supply hot undistilled water to a hot water system, the withdrawal means being adjustable in height with respect to the distillate collecting means whereby to permit adjustment of the distillate yield and the withdrawal rate of hot undistilled water, pressure drop means in the cold water supply means to throttle flow of the incoming cold water to correspond closely to the flow of hot water from the vessel to a hot water system under maximum demand, and barrier means in said upper portion to shield said uninsulated walls from the heat radiated from the flue.

3. An apparatus for the production of distilled water and undistilled hot water comprising: a vessel having walls forming an insulated lower portion and an uninsulated upper portion, a gas burner in the lower portion to heat a body of water therein to a temperature below the boiling point thereof and a flue for exhausting the combustion gases from the burner extending upwardly through he vessel, cold water supply means to maintain the vessel partially filled with water, whereby to provide vapor space in the upper portion, distillate collecting means positioned below the walls forming the upper portion, said uninsulated walls providing an inner heat transfer surface for vapor condensation thereon and a lower peripheral edge of the uninsulated wall flaring outwardly to direct flow of distillate from said heat transfer surface into the distillate collecting means, hot water withdrawal means in the upper part of the lower portion to supply hot undistilled water to a hot water system, the withdrawal means being adjustable in height with respect to the distillate collecting means whereby to permit adjustment of the distillate yield and the withdrawal rate of hot undistilled water, pressure drop means in the cold water supply means to throttle flow of the incoming cold water to correspond closely to the flow of the hot water from the vessel to a hot water system under maximum demand, and barrier means in said upper portion to shield said uninsulated walls from the heat radiated from the flue, said barrier means being spaced from the uninsulated walls and water surface a distance sufficient to facilitate the natural convective flow of vapors and gases in the vapor space of the upper portion.

4. An apparatus for the production of distilled water and undistilled hot water comprising: a vessel having walls forming an insulated lower portion and an uninsulated upper portion, a gas burner in the lower portion to heat a body of water therein to a temperature below the boiling point thereof and a flue for exhausting the combustion gases from the burner extending upwardly through the vessel, cold water supply means to maintain the vessel partially filled with water, whereby to provide vapor space in the upper portion, distillate collecting means positioned below the walls forming the upper portion, said uninsulated walls providing an inner heat transfer surface for vapor condensation thereon and a lower peripheral edge of the uninsulated wall flaring outwardly to direct flow of distillate from said heat transfer surface into the distillate collecting means, hot water withdrawal means in the upper part of the lower portion to supply hot undistilled water to a hot water system, the withdrawal means being adjustable in height with respect to the distillate collecting means whereby to permit adjustment of the distillate yield and the withdrawal rate of hot undistilled water, pressure drop means in the cold water supply means to throttle flow of the incoming cold water to correspond closely to the flow of the hot water from the vessel to a hot water system under maximum demand, barrier means provided in the upper portion to shield said uninsulated walls from the heat radiated from the flue, said barrier means being donut shaped and occupying 25 to 75 percent of the volume of the vapor space of the upper portion of the vessel.

5. In combination, apparatus for the production of distilled water and undistilled hot water comprising a water tank and means therein for heating water below the boiling point thereof, a vaporizing vessel having an insulated lower portion and an uninsulated upper portion, means to deliver hot water from the water tank to the vaporizing vessel, means to maintain the vaporizing vessel partially filled with water whereby to provide vapor space in the upper portion, distillate collecting means positioned below the walls forming the upper portion, said uninsulated walls providing a heat transfer surface for condensation thereon and a lower peripheral edge of the uninsulated wall flaring outwardly to direct distillate from said heat transfer surface into the distillate collecting means, withdrawal means in the lower portion to supply hot undistilled water to a hot water system and to effect recirculation of cooled water back to the hot water tank, said withdrawal means being adjustable in height with respect to the distillate collecting means whereby to permit adjustment of the distillate yield, a pump means in the withdrawal means to effect circulation of water from the hot water tank through the vaporizing vessel, and a timer means provided to effect operation of said pump means and recirculation of cooled water at preselected intervals.

* * * * *